June 19, 1956  A. G. SWENSON  2,750,695
STEAM FLATIRON
Filed Jan. 21, 1954
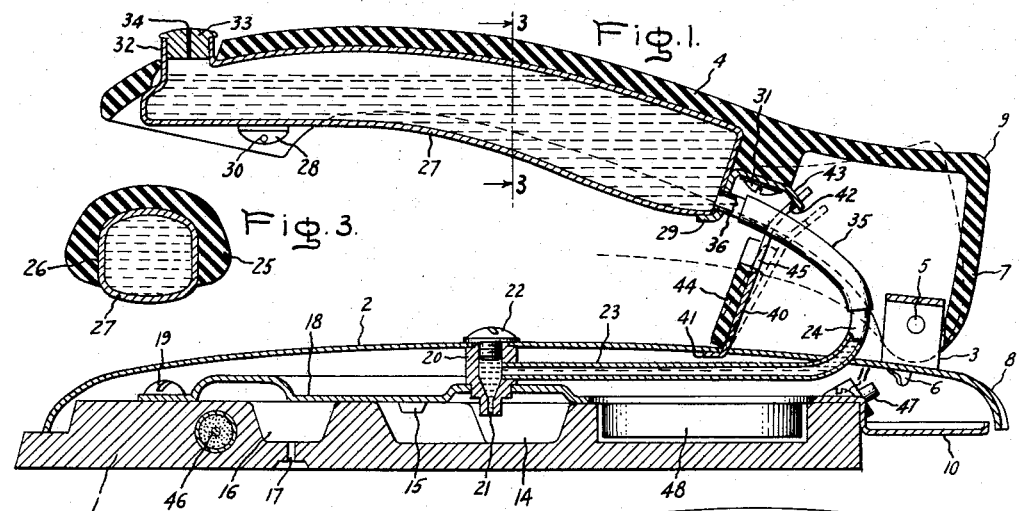
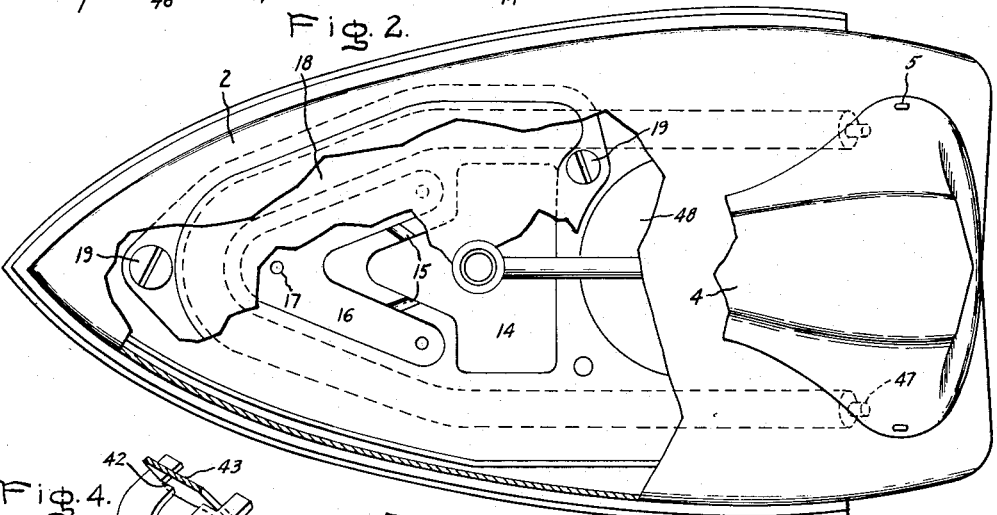
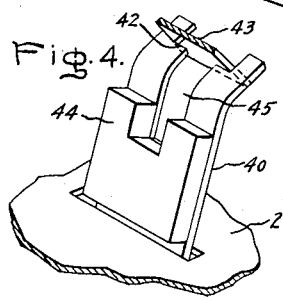
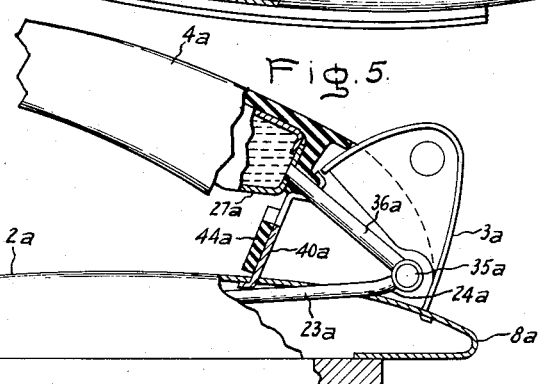
Inventor
Alfred G. Swenson
by Frank L. Neuhauser
His Attorney United States Patent Office 2,750,695
Patented June 19, 1956

2,750,695
STEAM FLATIRON

Alfred G. Swenson, Ontario, Calif., assignor to General Electric Company, a corporation of New York Application January 21, 1954, Serial No. 405,327

4 Claims. (Cl. 38—77)

The present invention relates to steam flatirons wherein a reservoir for holding water is built directly into and forms a part of the flatiron. It relates more particularly to flatirons of the so-termed "travel" type which are provided with pivoted handles whereby the handle may be folded down onto the top wall of the flatiron cover to minimize the size of the flatiron when it is to be packed.

An object of the invention is to provide an improved steam flatiron which embodies a pivoted handle, which flatiron is simple in structure, compact, convenient to use, and capable of being manufactured at low cost; and for a consideration of what I believe to be novel and my invention attention is directed to the following specification and to the claims appended thereto.

According to a now preferred form of the invention, there is embodied in a cavity in the underside of the pivoted handle of the flatiron a water reservoir which extends throughout the length of the handle and is connected to a pipe leading to the steam chamber of the flatiron by conduit means which includes a hinge whereby the handle may be folded down on the top wall of the flatiron cover, the arrangement being such that the reservoir blends in with and forms a part of the handle, and its hinge connection to the pipe is well concealed so as not to detract from the styling of the flatiron.

In the drawing, Fig. 1 is a longitudinal sectional view of a steam flatiron of the so-termed "travel" type embodying the invention.

Fig. 2 is a top plan view, partly broken away, of the flatiron.

Fig. 3 is a sectional view taken on line 3—3, Fig. 1.

Fig. 4 is a detail perspective view of the form of handle latch shown in Fig. 1.

Fig. 5 is a longitudinal sectional view similar to Fig. 1 showing a modification.

Fig. 6 is a detail perspective view of the form of handle latch shown in Fig. 5.

Referring to the drawing, Figs. 1 to 4, 1 indicates the soleplate and 2 the cover of the flatiron, the two parts being fastened together by suitable means such as that hereinafter described and together forming the body of the flatiron. Fixed on the heel or rear end of the flatiron cover is a suitable bracket 3 on which is pivoted the handle 4, the pivot means being indicated at 5. Bracket 3 may be of any suitable construction. It is shown as comprising a U-shaped frame attached to cover 2 by integral ears 6 on the lower edges of the bracket which extend through slots in the cover and are fastened by twisting them sidewise with respect to the cover. The rear end of the handle is in the form of a tubular post or housing 7 which is open toward the front of the flatiron and it is specifically the side walls of post 7 in which the pivot means is located. At the heel end of the flatiron, cover 2 extends beyond the rear end of soleplate 1 to provide a rear projection 8 which in conjunction with the upper rear corner 9 of the handle forms a heel rest upon which the flatiron may be upended. The space between the end of the soleplate and projection 8 is closed by a plate 10 fastened to the soleplate by a screw or screws 11.

On soleplate 1 are walls which define a steam chamber 14 from which steam generated in the chamber may flow through passages 15 and a distributing cavity 16 to ports 17 which direct the steam to the surface being ironed. Steam chamber 14 and cavity 16 are covered by a plate 18 fastened to the soleplate by a suitable number of screws 19. Fixed in an opening in plate 18 over steam chamber 14 is a nipple or member 20 having a metering orifice 21 through which water is supplied to the steam chamber. The top of nipple 20 abuts against the underside of cover 2 and is in line with an opening therein through which extends a screw plug 22 which serves both to secure the cover to the soleplate and when removed to give access to orifice 21 for cleaning it should it become clogged by sediment.

Connected to nipple 20 is a water supply pipe 23 the outer end 24 of which projects out through cover 2 in the vicinity of pivot means 5. Handle 4 has side walls 25 which with the top wall of the handle form a downwardly facing recess or cavity 26 in the under side of the handle which extends throughout the length of the handle, and in cavity 26 is mounted a water reservoir 27. The reservoir may be held in the cavity by any suitable means. In the present instance, it is shown as being held by front and rear brackets 28 and 29 held in place by screws 30 and 31. At the front end of reservoir 27 is a collar 32 which projects up through an opening in the top wall of the handle and forms a spout through which water may be poured into the reservoir for filling it. The spout may be closed by a removable plug 33 provided with an air vent opening 34.

The rear end of reservoir 27 adjacent to its bottom wall is connected to the outer end 24 of water supply pipe 23 by conduit means which include a hinge whereby the handle may be lowered and raised on its pivot. To advantage the connection may be formed by a length of flexible tube 35 of suitable heat resistant material, such as silicon rubber for example, which at one end is connected to supply pipe 24 and at the other end is connected to a short water discharge nipple 36 fastened in the end wall of the reservoir adjacent to its bottom wall.

Means are provided for latching the pivoted handle in its ironing position which means is readily released to permit of the handle being lowered down against the top wall of the flatiron cover. Insofar as my present invention is concerned, any suitable means may be used. In the present instance there is shown a latching means comprising a rectangular spring plate 40 fixed to cover 2 as indicated at 41. At its upper end it is provided with a notch which provides a shoulder 42 adapted to be positioned under a projecting tongue 43 on bracket 29 (see Fig. 4). When the spring plate is in the position shown in Figs. 1 and 4, tongue 43 rests on shoulder 42 to hold the pivoted handle in its upper ironing position. To fold the handle down on the cover 2, spring plate 40 is pressed rearwardly to move shoulder 42 from under tongue 43 after which the handle may be moved down against cover 2, the end of tongue 43 sliding down along the adjacent front surface of plate 40 as indicated in dotted lines in Fig. 1. At times the spring plate may be hot when the handle is being released and to protect the finger of the operator it is provided on the front side with a pad 44 of suitable heat resistant material. In plate 40 and pad 44 is a slot 45 through which tube 35 passes and in which it moves when the handle is being lowered and raised.

In Fig. 1, the heating unit of the flatiron is indicated at 46 and its terminals at 47. The invention may be embodied in a flatiron which does or does not have thermostatic means for regulating its temperature. Preferably, a temperature regulating thermostat means would be provided and such a means as indicated diagrammatically at 48. If desired the thermostat means may embody a thermostat setting lever. Details of the wiring for the flatiron and of the thermostat structure are not illustrated as suitable arrangements are known and they form no part of the present invention.

In Figs. 5 and 6 is shown a modification of the invention wherein the hinge means in the water supply conduit between the water reservoir and the water supply pipe is in the form of a hinged joint between two pipe ends. In Figs. 5 and 6 parts corresponding to those of Figs. 1 to 4 have been given reference characters the same as those of Figs. 1 to 4 with the letter *a* added. In this modification there is connected with the water reservoir 27*a* a discharge pipe 36*a* which at its outer end is connected to water supply pipe end 24*a* by a hinged joint 35*a* of suitable construction such that water may flow through it from reservoir 27*a* to water supply pipe 23*a* and pipe 36*a* may swing on pipe end 24*a* to permit of the handle being lowered and raised. In this modification the handle latch means is slightly different from that of Figs. 1 to 4 but it functions in the same way as does the Figs. 1 to 4 construction and its operation will be obvious from an inspection of the drawing without further explanation.

When there is no water in reservoir 27 the flatiron may be used for dry ironing in the usual way, the handle being in its ironing position as shown in Fig. 1.

When the flatiron is to be used for steam ironing, plug 33 is removed from spout 32, the reservoir filled with water and the plug then replaced in the spout. The flatiron is then ready for steam ironing. When being so used, water from reservoir 27 flows through tube 35, pipe 23 and metering orifice 21 to steam chamber 14 where it is flashed into steam and the steam fed to orifice 17 by way of passages 15 and cavity 16. After ironing is finished, any water left in reservoir 27 may be poured out through spout 32. The handle may be left in its ironing position; or if the flatiron is to be packed the handle may be folded down against cover 2 by releasing the handle latch after the manner already described.

By my invention I provide a steam flatiron which is simple in structure, convenient to use, and capable of being manufactured at low cost. By arranging the water reservoir in a cavity in the handle I do not add to the overall size of the flatiron while at the same time there is provided a reservoir having ample capacity for an ironing operation; and since the reservoir is for the most part concealed in the handle it does not interfere with the styling of the flatiron or detract from its appearance. The reservoir can be easily assembled in the handle cavity and connected to water pipe 23 and if needs be it can be quickly and easily replaced by a new reservoir in an obvious manner.

What I claim as new and desire to secure by Letters Patent of the United States is:

1. In a steam flatiron, a body having a steam chamber therein, a handle which extends across the body, hinge means connecting the handle to the body whereby the handle may be moved from an ironing position where it is spaced from the top wall of the body to a position where it is folded down against the body, a water supply pipe connected to said steam chamber, the outer end of said pipe terminating at the rear end of the flatiron in the vicinity of the handle hinge means, a water reservoir in said handle, and conduit means including hinge means connecting said reservoir to the outer end of said water supply pipe, said handle including a downwardly facing cavity at the rearward hinged end thereof, said conduit hinge means being concealed within said cavity.

2. The combination defined by claim 1 wherein the hinge means is in the form of a length of flexible hose.

3. In a steam flatiron, a flatiron body having a steam chamber therein, a handle pivoted at the rear end of the body and extending forwardly toward the front end of the body, latch means forming a part of the flatiron for holding the handle in ironing position, said latch means being releasable to permit of the handle being turned on its pivot to a position against the top wall of the flatiron body, said handle comprising top and side walls which define a downwardly facing cavity which extends longitudinally of the handle, a water reservoir removably received in said cavity whereby it is at least partially concealed within the handle, a water supply pipe connected to said steam chamber, the outer end of said pipe terminating in the vicinity of the handle pivot, and conduit means including hinge means connecting said reservoir to the outer end of said water supply pipe.

4. The combination defined by claim 3 wherein the hinge means comprises a length of flexible hose.

References Cited in the file of this patent

UNITED STATES PATENTS

| Re. 16,886 | Walker | Feb. 21, 1928 |
| 1,535,592 | Forshee | Apr. 28, 1925 |
| 2,284,411 | Fielding | May 26, 1942 |
| 2,433,556 | Hume | Dec. 30, 1947 |